UNITED STATES PATENT OFFICE.

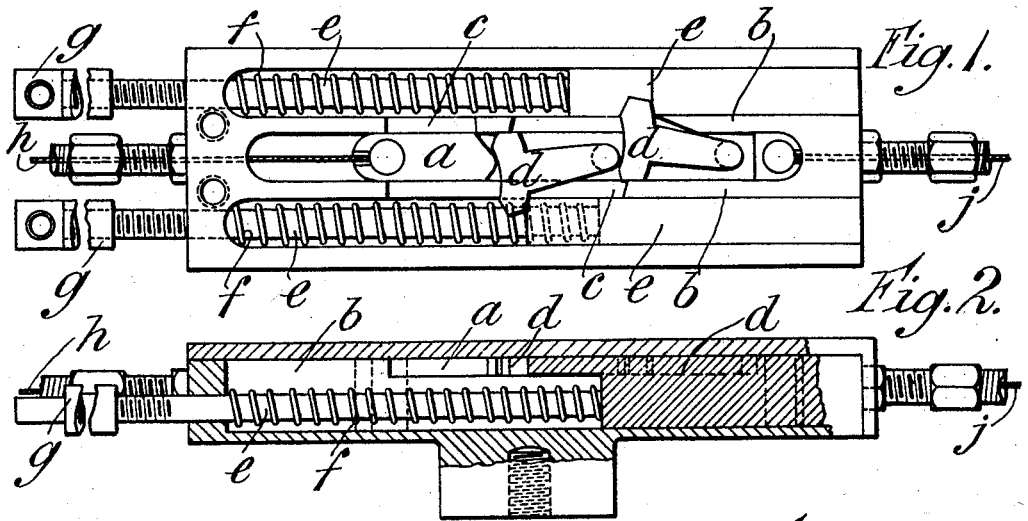
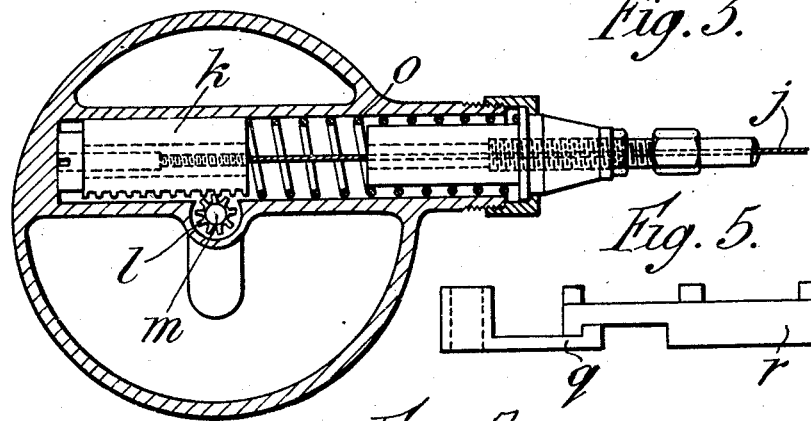
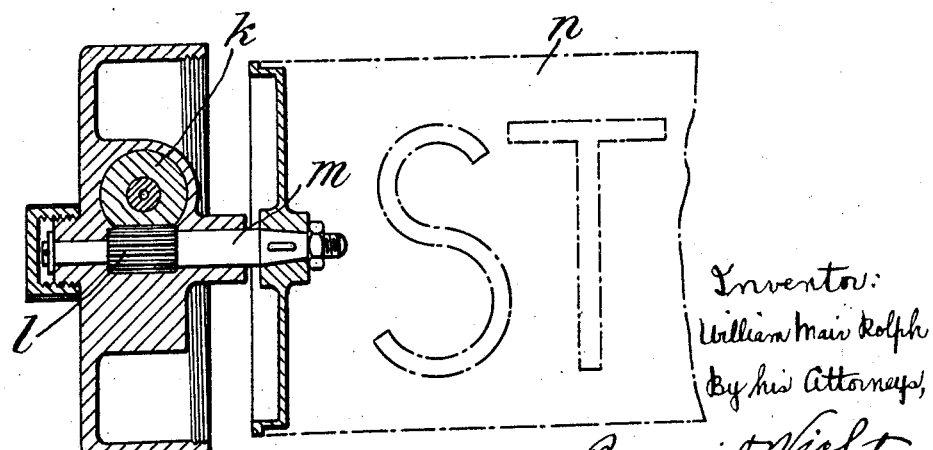

WILLIAM MAIR ROLPH, OF LONDON, ENGLAND.

SIGNALING APPARATUS.

1,406,494.  Specification of Letters Patent.  Patented Feb. 14, 1922.

Application filed August 23, 1921. Serial No. 494,721.

*To all whom it may concern:*

Be it known that I, WILLIAM MAIR ROLPH, a subject of the King of Great Britain, residing at 66 Piccadilly, London, England, have invented new and useful Improvements in Signaling Apparatus, of which the following is a specification.

This invention relates to signaling apparatus especially applicable to traffic indicators on vehicles or stationary indicators for the regulation of the traffic by police or others.

One object of my invention is to provide a compensating device whereby a pedal or lever operating the apparatus may be moved without affecting the signal after the signal has been made, and another object of my invention is to provide an improved mechanism for operating the indicator.

The indicating apparatus may in the case of vehicles be a combined indicator and tail lamp and may be so operated that when slowing up a vehicle either by declutching or depressing the foot brake pedal the word "slow" is shown on the indicator, whilst when the side brake lever is operated the word "stop" is shown. The indicator may also show the words "right" or "left" or arrows pointing in these directions when operated by means of a hand lever which may be mounted on the steering column. In all cases when the levers are released the indicator returns to the zero or blank position.

According to this invention a slide mounted between guide plates is connected to the indicator and pivoted to the slide is a catch or pawl in engagement with one of the guide plates. A plunger or control bar is mounted in proximity to the slide which plunger or bar when operated engages the catch and moves the slide until the catch enters a recess in the guide plate and disengages itself from the plunger which is free to move against the action of a spring without affecting the indicator. Preferably the slide has two pivoted catches each operated by a plunger, the recesses in the guide plates being so arranged that the slide is caused to travel a longer distance by the operation of one plunger than by the other. The plungers may be operated by levers or pedals, thus moving the slide which may also be directly operated from levers, pedals or handles.

Preferably the slide is made in two parts so that the movement caused by the operation of the plungers does not affect the direct connection between the slide and a lever or pedal or handle.

The plunger giving the slide the shorter travel may in the case of vehicles be connected to the clutch or foot brake pedal whilst the other plunger may be connected to the side brake lever, and the slide may be directly connected to the hand lever for indicating the directions "left" and "right," the slide being caused to travel a longer distance in one case than in the other. The indicator may be operated by a rack in mesh with a pinion on the shaft of the indicator, whilst the rack is connected to the slide. When the slide is operated the rack is caused to travel against the action of a spring which causes it to return to its zero position when the rack is released.

The accompanying drawings illustrate an apparatus made in accordance with this invention.

Figure 1 is a plan of a slide having two plungers and Figure 2 is a longitudinal section of the same. Figure 3 is a section of the end of an indicator showing the rack and Figure 4 is a longitudinal section of the same. Figure 5 is an elevation of the preferred form of slide.

A slide $a$ is mounted between two guide plates $b$ $b$ having recesses $c$ $c$ and pivoted to the slide $a$ are two T shaped catches $d$ $d$, one end of the cross piece of the T being in each case in contact with one of the plates $b$. $e$ $e$ are plungers which engage with the opposite cross pieces of the Ts respectively and when either of the plungers $e$ is moved the catch $d$ corresponding to it is moved together with the slide $a$ until the cross piece of the catch reaches a recess $c$ into which it enters owing to the turning action imparted to the catch $d$ by the shape of the surface of the cross piece engaged by the plunger. When either of the catches $d$ enters its recess $c$ the corresponding plunger $e$ is disengaged and is free to travel against the action of a spring $f$ which returns the plunger to the zero position when the operating lever is released. The plungers $e$ are connected to the brake pedals or side brake by connections secured to the adjustable nuts $g$ which screw on to the ends of the plungers. Similarly the slide $a$ is directly connected by a wire $h$ to the hand lever for indicating direction. When the slide is constructed in the manner shown in Figure 5, namely, in two parts $q$ and $r$, the part $q$ is connected by the wire $h$ to the hand lever and the part $r$ carries the catches $d$ $d$. The parts $q$ and $r$ can slide upon one another so that when the part $r$ is caused to move by the action of one of the plungers $e$ upon its catch $d$, the part $r$ can move without moving the part $q$. By this arrangement the wire $h$ is unaffected by the movement of the part $r$.

The slide $a$ is also connected by a wire $j$ to a rack $k$ meshing with a pinion $l$ on the shaft $m$ of the indicator $n$. When the rack $k$ is operated by the slide $a$ it is caused to travel against the action of a spring $o$ which when the slide $a$ is released causes the rack to return to its zero position.

What I claim is:—

1. Signaling apparatus comprising an indicator, operated by a slide, a catch on the slide, a plunger which engages the catch and moves the slide so that when the slide has travelled the required distance the catch is disengaged and the plunger is free to move without affecting the indicator.

2. The combination of an indicator with a slide connected thereto and mounted between guide plates, a catch pivoted to the slide and in engagement with one of the guides, a plunger which engages the catch and moves the slide, a recess in the guide into which the catch enters disengaging itself from the plunger which is free to move against the action of a spring without affecting the indicator.

3. Signaling apparatus as in claim 1 or 2 in which the slide is made in two parts capable of sliding upon one another.

4. The combination as in claim 1 or 2 in which there are two catches pivoted to the slide and two plungers operating the catches, one of which causes the slide to move a greater distance than the other.

5. The combination with an indicator of a slide connected to the indicator and mounted between guides, two catches pivoted to the slide, each in engagement with one guide, two plungers each adapted to engage a catch, one connected to a pedal and the other to a side brake lever, two springs each engaging a plunger, a recess in each guide to receive a catch, and disengage it from the plunger and a connection between the slide and a hand lever.

6. Signaling apparatus comprising an indicator, a slide operating the indicator, a catch on the slide, a plunger adapted to engage the catch to operate the slide, means for disengaging the slide and a spring on the plunger.

7. Signaling apparatus comprising an indicator, a shaft on which the indicator is mounted, a pinion on the shaft, a rack meshing with the pinion, a slide connected to the rack, a catch on the slide, a plunger adapted to engage the catch, means for disengaging the slide and a spring on the plunger.

8. Signaling apparatus comprising an indicator, a slide operating the indicator and mounted between guides, a catch on the slide, a plunger adapted to engage the catch, a recess in one of the guides and a spring on the plunger.

9. Signaling apparatus comprising an indicator, a shaft on which the indicator is mounted, a pinion on the shaft, a rack meshing with the pinion, a slide connected to the rack and mounted between guides, a catch on the slide, a plunger adapted to engage the catch, a recess in one of the guides and a spring on the plunger.

10. Signaling apparatus comprising an indicator, a slide operating the indicator and mounted between guides, two catches on the slide, two plungers each adapted to engage a catch, two springs one on each plunger and a recess in each guide adapted to receive a catch.

11. Signaling apparatus comprising an indicator, a slide made in two parts operating the indicator, a catch on the slide, a plunger adapted to engage the catch, means for disengaging the slide and a spring on the plunger.

12. Signaling apparatus comprising an indicator, a slide made in two parts operating the indicator, two catches on one part of the slide, two plungers each adapted to engage a catch, one plunger connected to a pedal and the other to a brake lever, two springs one on each plunger, a recess in each guide adapted to receive a catch and a connection between the other part of the slide and a hand lever.

In testimony that I claim the foregoing as my invention I have signed my name this tenth day of August, 1921.

WILLIAM MAIR ROLPH.